May 10, 1966  E. R. BYSTEDT  3,250,361
BRAKING STRUCTURE FOR CONVEYORS
Filed Oct. 25, 1963  3 Sheets-Sheet 2
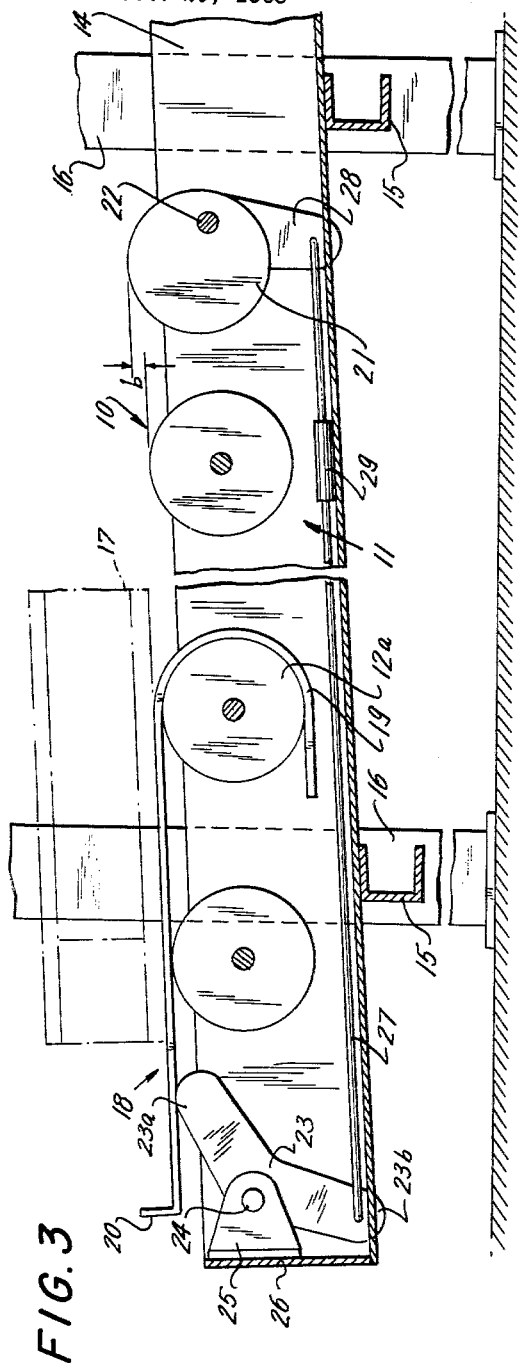
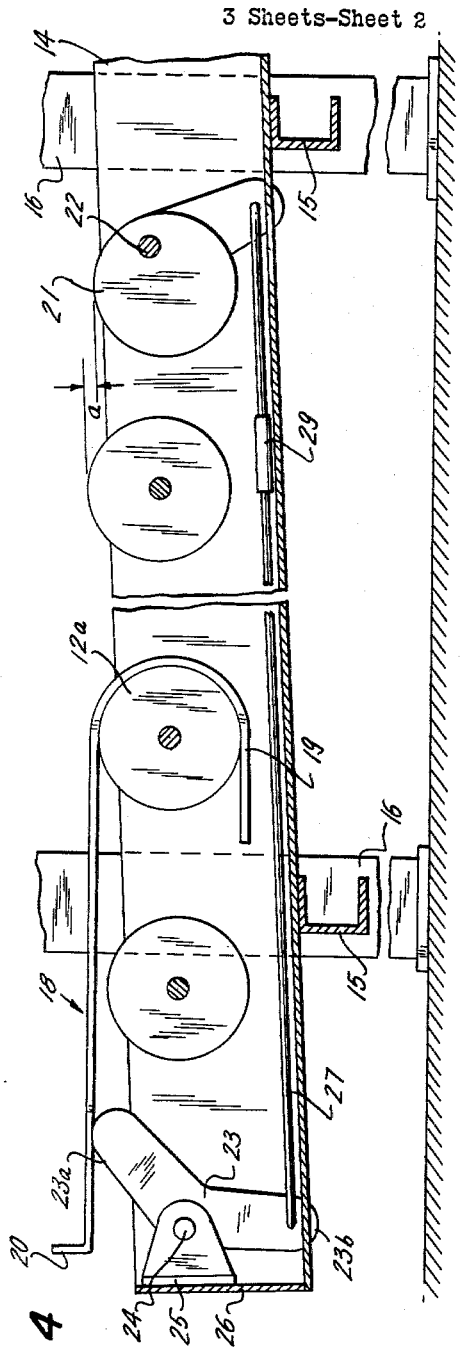
FIG. 3
FIG. 4
INVENTOR
Erik Ragnar Bystedt
BY
his ATTORNEY May 10, 1966   E. R. BYSTEDT   3,250,361
BRAKING STRUCTURE FOR CONVEYORS
Filed Oct. 25, 1963   3 Sheets-Sheet 3

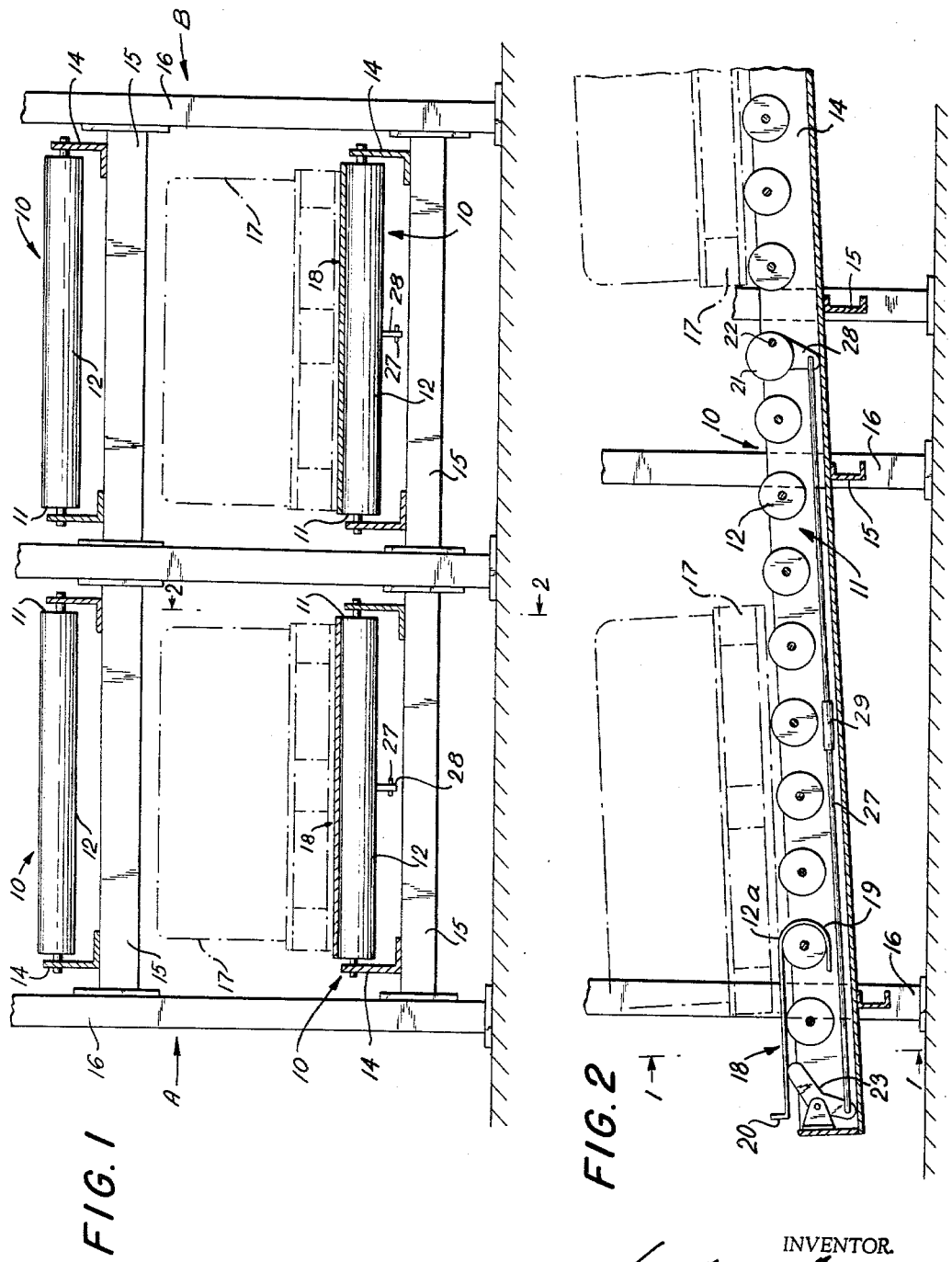

INVENTOR.
Erik Ragnar Bystedt
BY
Edmund A. [signature]
his ATTORNEY

United States Patent Office 3,250,361
Patented May 10, 1966

3,250,361
BRAKING STRUCTURE FOR CONVEYORS
Erik Ragnar Bystedt, Säffle, Sweden, assignor to Aktiebolaget Electrolux, Stockholm, Sweden, a corporation of Sweden
Filed Oct. 25, 1963, Ser. No. 318,958
7 Claims. (Cl. 193—35)

My invention relates to conveyors of the type having a conveyor line along which successive articles travel with the aid of gravity, and more particularly to structure for braking the movement of articles on the conveyor line.

An object of my invention is to provide an improvement for braking movement of a first article on a conveyor line by a resisting frictional force developed between the article and a plate upon which the article moves and braking and retarding the movement of a second article on a conveyor line so that, when it strikes the first article ahead of it on the conveyor line, which may be stationary, the impact force of the second article against the first article will be materially reduced.

A further object of the invention is to provide an improvement for arresting movement of a first article on a conveyor line and braking and retarding movement of the next succeeding article by mechanism which is rendered operable by the arrested first article.

My invention will be more fully set forth in the following description referring to the accompanying drawing, and the features of novelty which characterize my invention will be pointed out with particularity in the claims annexed to and forming a part of this specification.

Figure 5:
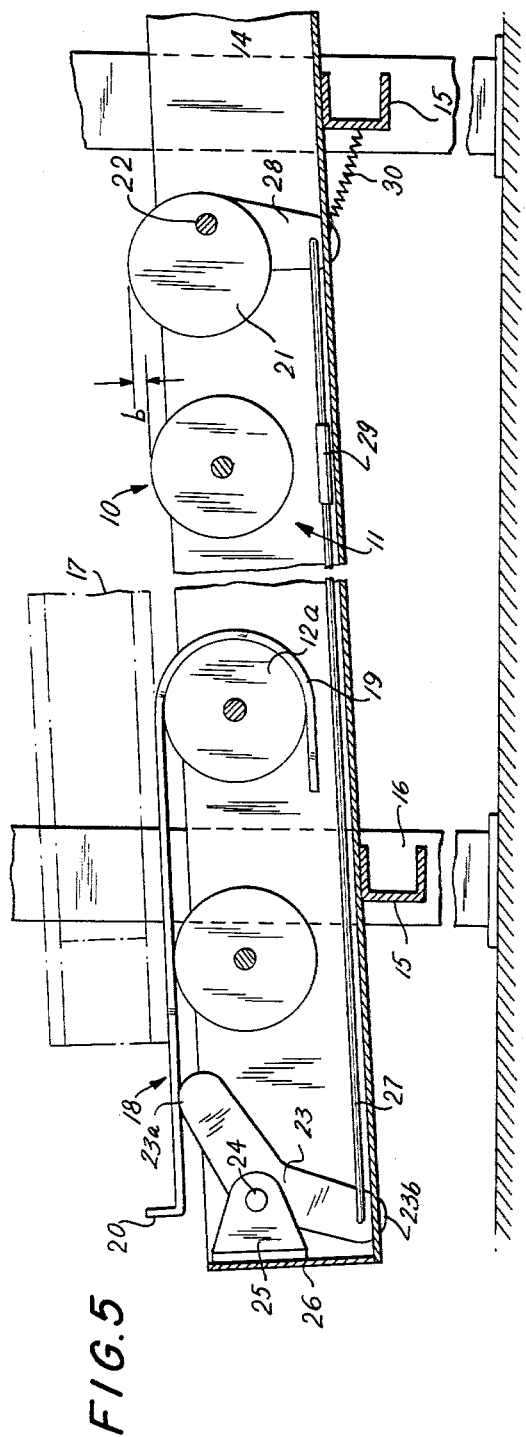
Figure 6:
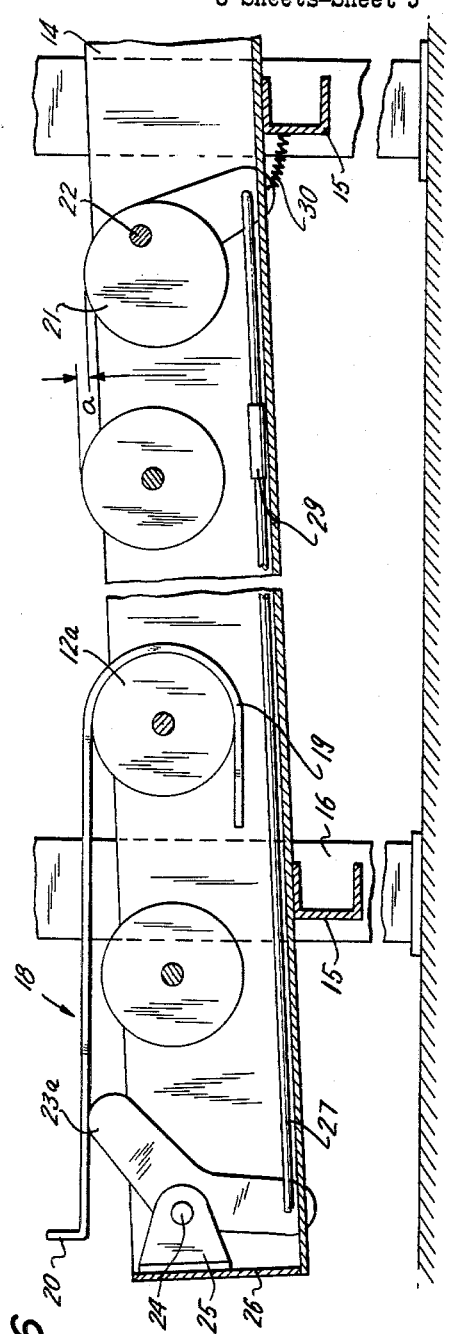

In the drawing, FIG. 1 is a vertical sectional view, taken on line 1—1 of FIG. 2, of a portion of conveyor structure embodying my invention; FIG. 2 is a vertical sectional view, taken on line 2—2 of FIG. 1, of one conveyor line of the conveyor structure shown in FIG. 1; FIGS. 3 and 4 are enlarged sectional views, partly broken away, of parts of FIG. 2 more clearly illustrating the construction; and FIGS. 5 and 6 are sectional views similar to FIGS. 3 and 4 illustrating a modification of the invention.

Referring to the drawing, I have shown my invention in connection with conveyor structure having two groups A and B of conveyor lines 10 alongside one another, the two conveyor lines 10 in each group being disposed one above the other. Each conveyor line 10 comprises an inclined rollerway 11 having a plurality of parallel cylinders or rollers 12 journaled in downwardly inclined side frames 14. The side frames 14 are supported by members 15 which extend transversely of the conveyor lines 10 and are fixed at their ends to upright supports 16. The conveyor lines 10 are adapted to receive articles 17 which move downward by gravity on the inclined rollerways 11.

A member 18 is provided at the lower end of each rollerway 11 which functions to decrease the rate of speed at which an article 17 moves downward over the rollers 12. Each member 18 comprises an essentially flat plate which, together with the rollers 12, defines the path of movement along which the articles 17 travel on the conveyor lines 10. The plates 18 extend across the conveyor lines between the side frames 14 and are substantially as wide as the rollers 12 are long. Further, the plates 18 are mounted on the conveyor lines 10 so that they are essentially immovable lengthwise of the rollerways 11. In the preferred embodiment shown, I accomplish this by bending back upon itself the end of each plate 18 initially contacted by an article 17 to form a curved end 19 which is semi-circular in section and snugly fits about one of the rollers 12a. The curved ends 19 of the plates 18 essentially are hooks which hold the article receiving ends of the plates in fixed longitudinal positions on the conveyor lines and prevent longitudinal movement of the plates on the rollerways. At regions intermediate their ends the plates 18 rest on at least one of the rollers 12 and are formed with upwardly bent ends 20 at their lower ends which are in the path of movement of the articles 17 and function to stop movement of the articles on the plates 18.

When an article 17 traveling on a rollerway 11 moves over the relatively extensive surface of a plate 18, it is retarded by friction developed between the article and the plate, the kinetic energy of the moving article being expended against the resisting frictional force to arrest movement of the article. When an article on the plate strikes the upwardly bent end 20 of the plate, it comes to a stop.

After an article 17 travels downward on a rollerway 11 and the plate 18 at its lower end functions to brake and stop the article, it is desirable to brake and slow down the rate of movement of the next succeeding article on the rollerway before it comes to a stop against the article resting on the plate 18. I accomplish this by providing in each rollerway 11 a member 21 which functions as a brake and over which an article passes in its path of movement before it reaches the plate 18. The brake member 21 is of cylindrical form and essentially like the rollers 12. However, the brake member 21 is provided with eccentrically disposed end shafts 22 which are journaled in the side frames 14 for mounting the member 21 for limited eccentric movement between upper and lower positions seen in FIGS. 3 and 4, respectively.

When the brake member 21 is in its lower position seen in FIG. 4, the top of the member 21 is at a level below a plane tangent to the tops of the rollers 12 next to and at each side of it and removed by the vertical distance $a$ from the path of movement along which articles travel on the rollers 12. Therefore, in its lower position the brake member 21 is out of the path of movement of articles normally traveling on the rollers and is ineffective to brake and retard movement of an article passing over it. When the brake member 21 is in its upper position seen in FIG. 3, the top of the member 21 is at a level above a plane tangent to the tops of the rollers 12 next to and at each side of it and higher by the vertical distance $b$ from the path of movement along which articles travel on the rollers 12. Therefore, in its upper position the braking member 21 is in the path of movement of articles traveling on the rollers 12 and functions to brake and retard movement of the articles. An article traveling downward on the rollers 12 initially strikes the raised braking member 21 which slows down its rate of movement, and then it moves upward the vertical distance $b$ while passing over a portion of the peripheral surface of the member 21. The article then continues to move at a slower rate of speed toward the plate 18.

In accordance with my invention, the braking member 21 is moved to its upper braking position responsive to an article 17 on the plate 18. The mechanism for controlling the position of the braking member 21 in each conveyor line 10 comprises an elbow-shaped crank or rocker element 23 pivoted intermediate its ends at 24 to a bracket 25 fixed to a member 26 extending transversely of the rollerway 11 and secured at its ends to the side frames 14. The rocker element 23 includes a first arm 23a which extends upward toward the bottom of the plate 18, and a second arm 23b which extends downward, to the lower end of which is pivotally connected one end of a stiff elongated rod 27, the opposite end of which is pivotally connected to a lug or lever 28 secured to the braking member 21. The rod 27 may be provided with a turnbuckle 29 to adjust the overall length of the rod so that the parts of the mechanism will function properly and excessive play between the rocker element 23 and lug 28 will be eliminated.

The braking member 21 is eccentrically journaled in the side frames 14 in such manner that it tends to move by gravity about the end shafts 22 to its lower position seen in FIG. 4. When the member 21 moves downward by its own weight to a level lower than the rollers 12 adjacent thereto, the lug 28 moves counterclockwise, and, through the rod 27, imparts counterclockwise movement to the rocker element 23 whereby the upper crank arm 23a acts on the underside of the plate 18 and lifts the latter to its raised position illustrated in FIG. 4. The hook 19 on the plate 18, which snugly fits about a roller 12, functions as a pivotal support for the plate 18 which permits it to be angularly moved about its hooked end.

When an article 17 travels downward on a rollerway 11 with the parts in the position shown in FIG. 4, the article will pass over the braking member 21 which is out of the path of movement of the article. As the article moves over the surface of the plate 18, it is retarded by friction and comes to a stop before reaching the final stop 20 and after moving over only a portion of the length of the plate 18, as shown in FIG. 3. Due to the weight of the article on the plate 18, the latter moves downward about its hooked end 19 and imparts clockwise movement to the rocker element 23 which in turn moves the rod 27 toward the left. The braking member 21 turns about its eccentrically disposed axis responsive to such movement of the rod and is raised to its upper braking position seen in FIGS. 2 and 3.

When a second article 17 now travels downward on the rollerway 11, as illustrated in FIG. 2, the raised braking member 21 will be in the path of movement of the second article and will brake and slow down its rate of movement in the manner explained above. After being slowed down, the second article 17 will strike the first article on the plate 18, and, as a result of the impact of the second article against the first article, the first article will slide forward a short distance on the plate and the kinetic energy of the second article will be expended against the resisting frictional force developed between the plate 18 and the first article.

When the second article 17 in FIG. 2 comes to a stop over the braking member 21, the latter will be ineffective to brake and slow the third article 17 traveling on the rollerway 11. Under these conditions, it is desirable for each conveyor line 10 to be so constructed and formed that the articles 17 do not move too fast at that part of the conveyor line between the braking member 21 and the article receiving end of the line. When a third article 17 traveling on the conveyor line strikes the second article ahead of it, the impact of the third article against the stationary second article will cause the first and second articles to move in unison toward the final stop 20. Under these conditions, the impact of the third article against the first and second articles will cause the first article to slide forward a short distance on the plate 18 and the kinetic energy of the third article will be expended against the resisting frictional force developed between the plate 18 and the first article.

The first article 17 on the plate 18 may be removed therefrom in any suitable manner, as by a fork-type truck, for example. Upon removal of the first article from the plate 18, the second article, which is on the rollers 12, will move downward on the inclined conveyor line onto the plate 18 and can be removed from the conveyor line 10. In this manner, successive articles 17 on the conveyor lines 10 can be removed from the lower ends of the lines. After the last article 17 has been removed from the conveyor line and the plate 18 no longer is being held down by an article 17, the braking member 21 will, due to its eccentric journaling in the side frames 14, move downward by gravity to its lower position shown in FIG. 4. Under these conditions, the braking member will be out of the path of movment of articles traveling on the conveyor line and the plate 18 will be moved to its raised inclined position shown in FIG. 4, as explained above.

Another embodiment of my invention is shown in FIGS. 5 and 6 in which parts similar to those illustrated in FIGS. 3 and 4 are referred to by the same reference numerals. The modification of FIGS. 5 and 6 differs from the embodiment just described in that the braking member 21 is resiliently biased to its lower position shown in FIG. 6. As diagrammatically illustrated, the lug or lever 28, which is secured to the braking member 21 at a region intermediate its ends, is connected to one end of a coil spring 30, the opposite end of which is connected to one of the transverse members 15 for supporting the side frames 14. From FIGS. 5 and 6 it will be clear that the coil spring 30 augments gravity to move the braking member 21 from its upper braking position to its lower ineffective position when any article on the plate 18 is removed therefrom. When an article moves on the plate 18 after traveling down a rollerway 11 and the plate moves to its lower position seen in FIG. 5, the rocker element 23 and rod 27 become effective to impart turning movement to the braking member 21 and raise it to its upper position shown in FIG. 5. In this modification, the braking member 21 is raised to its upper position against the resiliently biasing action of the coil spring 30.

In view of the foregoing, it will now be understood that the spaced rollers 12 define a path of movement for the articles 17 which is tangent to the top surfaces of the rollers. Each of the conveyor means 10 at one level has an article receiving zone, which is at the right in FIG. 2; and an end zone at a lower level, which is at the left in FIG. 2, from which articles are removed. The articles move from the article receiving zone to the end zone by gravity.

The device for braking the articles moving from the article receiving zone to the end zone comprises the plate-like member 18 defining a part of the path of flow for the articles at the vicinity of the end zone and has a front portion at the vicinity of the roller 12a, which is initially contacted by an article 17 moving thereon, and a rear portion. The front portion of the plate-like member 18 constitutes the extreme forward component of the braking device which functions to brake articles moving thereon. The rear portion of the plate-like member 18, at the upward bent end 20, is more remote from the article receiving zone than the front portion thereof at the vicinity of the roller 12a.

The front curved end 19 of the plate-like member 18 functions as means for anchoring the front portion of the plate-like member 18 to the conveyor structure with the front portion of the plate-like member tangent to the peripheral surface of the one roller 12a of the plurality of rollers which is nearest to the article receiving zone at the higher level. The anchoring means 19 holds the plate-like member 18 immovable lengthwise of the path of movement in a direction from the article receiving zone.

As explained above, the anchoring means 19 functions to enable the plate-like member 18 to move angularly between upper and lower positions about an axis at the vicinity of the one roller 12a of the plurality of rollers 12, the plate-like member 18 in its lower position being tangent to the top surfaces of at least two of the rollers, as shown in FIGS. 3 and 5. The braking roller 21, which becomes operative and is moved to its upper position when an article 17 moves onto the plate-like member 18, is eccentrically mounted on the conveyor structure by end shafts 22. It will be seen that the end shafts 22 for eccentrically mounting the roller 21 are independent of the anchoring means 19 for the plate-like member 18 and removed therefrom lengthwise of the path of movement. The mechanism comprising the rocker element 23, rod 27 and lever 28 function to move the roller 21 to its upper position responsive to movement of the plate-like member 18 to its lower position.

Although I have shown and described several embodiments of my invention, I do not wish to be limited to the particular arrangements set forth, and I intend in the following claims to cover all modifications which do not depart from the spirit and scope of my invention.

I claim:

1. In a conveyor, structure comprising a plurality of rollers of cylindrical form defining a path of movement for articles, a device for braking articles traveling along said path of movement, said device comprising a first member which is substantially immovable lengthwise of said path of movement, said first member having a surface which forms a portion of said path of movement at a first zone thereof and which functions to retard an article by the friction developed between the article and said surface when the article moves thereon, whereby the kinetic energy of the moving article is expended against the resisting frictional force, an element which is movable between first and second positions, said element being movable from its first position to its second position responsive to movement of an article onto said surface, a second member which is of cylindrical form and essentially like said rollers, means for eccentrically mounting said second member on said structure for limited movement between lower and upper positions, said second member in its upper position interfering with movement of the article in a second zone along said path of movement and functioning to reduce the rate of speed at which the article leaves said second zone, the articles traveling along said path of movement initially moving past said second zone and from the latter toward said first zone, and means responsive to movement of said element to its second position to move said second member to its article interfering position.

2. Apparatus as set forth in claim 1 in which said second member and said part are so constructed and arranged that said second member tends to move to its lower position responsive to gravity and said element tends to move to its first position responsive to movement of said second member to its lower position when said surface is unoccupied by an article.

3. Apparatus as set forth in claim 1 which includes means for resiliently biasing said second member to its lower position and said element to its first position, said element being movable to its second position against the biasing action of said resilient means responsive to movement of an article onto said surface, and said second member being movable to its upper article interfering position against the biasing action of said resilient means responsive to movement of said element to its second position.

4. In a conveyor, structure comprising a plurality of rollers of cylindrical form defining a path of movement for articles, a device for braking articles traveling along said path of movement, said device comprising a first member having a surface which forms a part of said path of movement at a first zone thereof and which functions to retard an article by the friction developed between the article and said surface when the article moves thereon, whereby the kinetic energy of the moving article is expended against the resisting frictional force, means for mounting said first member on said structure to render said first member substantially immovable lengthwise of said path of movement and movable vertically between upper and lower positions, a second member which is of cylindrical form and essentially like said rollers, means for eccentrically mounting said second member on said structure for limited movement between lower and upper positions, said second member in its upper position interfering with movement of the article in a second zone along said path of movement and functioning to reduce the rate of speed at which the article leaves said second zone, the articles traveling along said path of movement initially moving past said second zone and from the latter toward said first zone, said first member being movable to its lower position responsive to movement of an article onto said surface, and means responsive to movement of said first member to its lower position to move said second member to its article interfering position.

5. Apparatus as set forth in claim 4 which includes means for resiliently biasing said second member to its lower position and said first member to its upper position, said first member being movable to its lower position against the biasing action of said resilient means responsive to movement of an article onto said surface, and said second member being movable to its upper article interfering position against the biasing action of said resilient means responsive to movement of said first member to its lower position.

6. Apparatus as set forth in claim 4 in which said means for eccentrically mounting said second member on said structure and said means responsive to movement of said first member to its lower position to move said second member to its article interfering position embody provisions normally tending to move said second member to its lower position responsive to gravity and tending to move said first member to its upper position responsive to movement of said second member to its lower position when said first member is unoccupied by an article.

7. In a conveyor, structure comprising a plurality of spaced rollers of cylindrical form defining a path of movement for articles which is tangent to the top surfaces of the rollers, the structure having an article receiving zone at one level and an end zone at a lower level from which articles are removed, the articles being adapted to move along the path of movement from said article receiving zone to said end zone by gravity, a device for braking articles moving on said structure from said article receiving zone to said end zone, said device comprising a plate-like member disposed above and overlying a plurality of said rollers at the vicinity of said end zone, said plate-like member defining a part of the path of movement for the articles at the vicinity of said end zone and having a front portion which is initially contacted by an article moving thereon from said article receiving zone and a rear portion, the front portion of said plate-like member constituting the extreme forward component of said device which functions to brake articles moving thereon, the rear portion of said plate-like member being more remote from said article receiving zone than the front portion thereof, means for anchoring the front portion of said plate-like member to said structure with the front portion of said plate-like member tangent to the peripheral surface of one of said plurality of rollers nearest to said article receiving zone, said anchoring means holding said plate-like member immovable lengthwise of said path of movement in a direction from said article receiving zone, said plate-like member having a surface forming a part of said path of movement at said end zone thereof and functioning to retard an article by the friction developed between the article and said surface when the article moves thereon, whereby the kinetic energy of the moving article is expended against the resisting frictional force, said anchoring means functioning to enable said plate-like member to move angularly through a vertical distance between upper and lower positions about an axis at the vicinity of said one of said plurality of rollers, said plate-like member in its lower position being tangent to the top surfaces of at least two of said rollers, a second member, means independent of said anchoring means and removed therefrom lengthwise of said path of movement for mounting said second member on said structure for vertical movement between lower and upper positions, said second member in its upper position interfering with and decelerating the rate of the movement of an article in an intermediate zone along said path of movement between said article receiving zone and end zone and functioning to reduce the speed at which the article leaves said intermediate zone, the articles traveling along said path of movement from said article receiving zone initially moving past said intermediate zone and from the latter toward said end zone, said plate-like member being movable to its lower position responsive to movement of an article onto said surface, and means responsive to movement of said plate-like member to its lower position to move said second member to its article interfering position.

References Cited by the Examiner
UNITED STATES PATENTS

| | | | |
|---|---|---|---|
| 521,023 | 6/1894 | Gates | 193—35 |
| 989,413 | 4/1911 | Porter | 193—32 X |
| 1,979,466 | 11/1934 | Hedenskoog | 193—40 X |
| 2,297,330 | 1/1941 | Scoepfer | 193—40 X |
| 2,298,921 | 10/1942 | Barker | 193—35 |
| 2,638,197 | 5/1953 | Small | 193—35 |

SAMUEL F. COLEMAN, *Primary Examiner.*

A. L. LEVINE, *Assistant Examiner.*